(12) United States Patent
Oved

(10) Patent No.: US 7,864,787 B2
(45) Date of Patent: *Jan. 4, 2011

(54) DEVICE, SYSTEM AND METHOD OF MULTICAST COMMUNICATION

(75) Inventor: Tzah Oved, Ramat Gan (IL)

(73) Assignee: Voltaire Ltd., Raanana (IL)

( * ) Notice: Subject to any disclaimer, the term of this patent is extended or adjusted under 35 U.S.C. 154(b) by 634 days.

This patent is subject to a terminal disclaimer.

(21) Appl. No.: 11/727,222

(22) Filed: Mar. 26, 2007

(65) Prior Publication Data

US 2008/0240130 A1 Oct. 2, 2008

(51) Int. Cl.
*H04L 12/28* (2006.01)
(52) U.S. Cl. .................. 370/401; 370/389; 370/400
(58) Field of Classification Search .......... 709/232, 709/225, 236, 400, 389; 370/395.5, 400, 370/389, 223, 201, 225
See application file for complete search history.

(56) References Cited

U.S. PATENT DOCUMENTS

| | | | |
|---|---|---|---|
| 7,003,586 B1 | 2/2006 | Bailey et al. | |
| 2003/0200315 A1* | 10/2003 | Goldenberg et al. | 709/225 |
| 2004/0190533 A1* | 9/2004 | Modi et al. | 370/400 |
| 2005/0080919 A1* | 4/2005 | Li et al. | 709/236 |

OTHER PUBLICATIONS

International Search report for PCT/IL08/000357 dated Nov. 12, 2008.
U.S. Appl. No. 11/727,221, filed Mar. 26, 2007.

* cited by examiner

*Primary Examiner*—Dang T Ton
*Assistant Examiner*—Pamit Kaur
(74) *Attorney, Agent, or Firm*—Eitan Mehulal Law Group

(57) ABSTRACT

Device, system and method of multicast communication. For example, an apparatus in accordance with an embodiment of the invention includes a non-kernel multicast protocol handler adapted to perform a multicast operation of a user mode application by bypassing the operating system kernel and directly accessing a communication adapter having an operating system bypass capability.

21 Claims, 3 Drawing Sheets

DEVICE, SYSTEM AND METHOD OF MULTICAST COMMUNICATION

BACKGROUND

A computing device may utilize an operating system (OS) having multiple modes of operation, for example, a kernel mode and a user mode. The kernel mode may directly access one or more components of the computing device, for example, a memory unit. The user mode may allow execution of one or more software applications, which may not directly access one or more components of the computing device. For example, a user mode software application may indirectly interact with a physical component of the computing device, e.g., utilizing an interface provided by the OS kernel. Unfortunately, the indirect interaction of a user mode software application may cause one or more performance drawbacks, for example, increased latency, increased consumption of processing power, increased consumption of bandwidth, reduced throughput, or the like.

SUMMARY

Some embodiments of the invention may include, for example, devices, systems and methods of multicast communication.

In some embodiments, an apparatus may include, for example, a non-kernel multicast protocol handler adapted to perform a multicast operation of a user mode application by bypassing the operating system kernel and directly accessing a communication adapter having an operating system bypass capability.

In some embodiments, the non-kernel multicast protocol handler is adapted to perform the multicast operation using a native semantic of the communication adapter.

In some embodiments, the communication adapter includes an InfiniBand adapter.

In some embodiments, the non-kernel multicast protocol handler is adapted to perform the multicast operation in user space.

In some embodiments, the multicast operation includes an Internet Protocol (IP) multicast operation, and the non-kernel multicast protocol handler is adapted to perform the IP multicast operation externally to a TCP/IP stack of the operating system kernel.

In some embodiments, the non-kernel multicast protocol handler is adapted to monitor operations sent by the user mode multicast application for execution by the operating system kernel.

In some embodiments, the non-kernel multicast protocol handler is adapted to intercept multicast operations.

In some embodiments, the non-kernel multicast protocol handler is adapted to intercept a multicast operation selected from a group consisting of: a multicast send operation, a multicast receive operation, an operation to add a multicast socket, an operation to delete a multicast socket, an operation to modify a multicast socket, and an operation to control a multicast socket.

In some embodiments, wherein the apparatus further includes a processor adapted to execute instructions of a multicast application.

In some embodiments, a method may include, for example, intercepting a multicast operation of a user mode application; and performing the multicast operation by bypassing an operating system kernel and directly accessing a communication adapter having an operating system bypass capability.

In some embodiments, the method may include performing the multicast operation using a native semantic of the communication adapter.

In some embodiments, the method may include performing the multicast operation using a native InfiniBand semantic.

In some embodiments, the method may include performing the multicast operation in user space.

In some embodiments, the multicast operation may include an Internet Protocol (IP) multicast operation, and the method may include performing the multicast operation externally to a TCP/IP stack of the operating system kernel.

In some embodiments, the method may include monitoring operations sent by the user mode application for execution by the operating system kernel.

In some embodiments, the method may include selectively intercepting the multicast operation in accordance with a pre-defined criterion.

In some embodiments, the method may include intercepting a multicast operation selected from a group consisting of: a multicast send operation, a multicast receive operation, an operation to add a multicast socket, an operation to delete a multicast socket, an operation to modify a multicast socket, and an operation to control a multicast socket.

Some embodiments may include, for example, a machine-readable medium having stored thereon instructions that, when executed by a machine, cause the machine to perform a method in accordance with embodiments of the invention.

Embodiments of the invention may provide additional and/or other benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
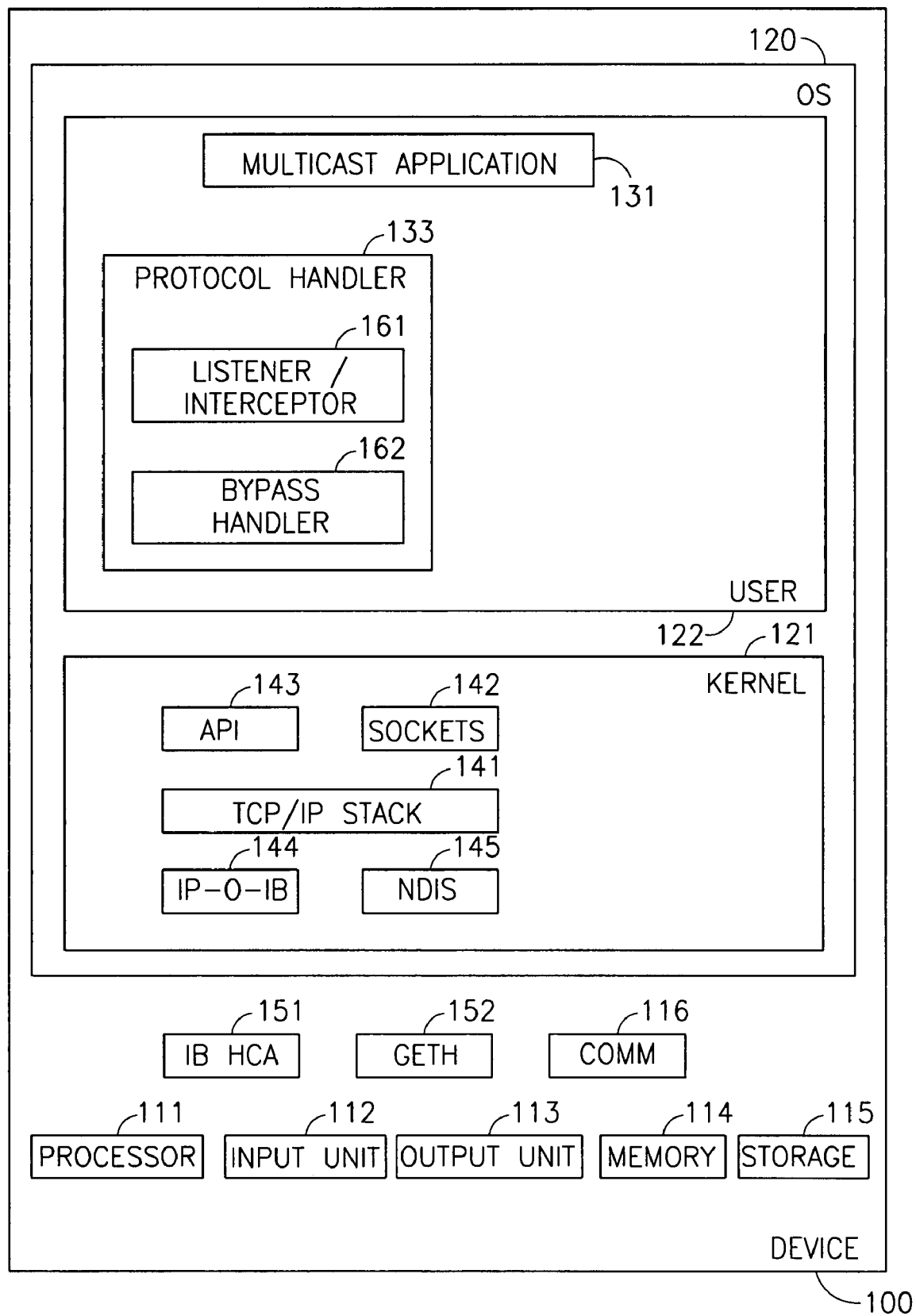
FIG. 1 is a schematic block diagram of a computing device able to utilize multicast communication in accordance with a demonstrative embodiment of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Embodiments of the invention may be used in a variety of applications. Some embodiments of the invention may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

Some embodiments of the invention may be used in conjunction with one or more types of wireless communication signals and/or systems, for example, radio frequency (RF), infra red (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like. Embodiments of the invention may be used in various other devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although portions of the discussion herein may relate, for demonstrative purposes, to wired links and/or wired communications, embodiments of the invention are not limited in this regard, and may include one or more wired links, may utilize one or more components of wireless communication, may utilize one or more methods or protocols of wireless communication, or the like. Some embodiments of the invention may utilize wired communication and/or wireless communication.

Although embodiments of the invention are not limited in this regard, the term "multicast" as used herein may include, for example, multicast communication, broadcast communication, wireless multicast communication, wired multicast communication, wireless broadcast communication, wired broadcast communication, multicast communication over the Internet or over a global communication network, broadcast communication over the Internet or over a global communication network, multicast communication using User Datagram Protocol (UDP), broadcast communication using UDP, web-cast communication (e.g., using the World Wide Web), multicast communication utilizing InfiniBand, broadcast communication utilizing InfiniBand, multicast communication utilizing Ethernet, broadcast communication utilizing Ethernet, multicast or broadcast communication utilizing iWarp, multicast communication utilizing network adaptors with OS bypass capabilities, reliable or unreliable multicast and/or broadcast communication, multicast or broadcast using Transmission Control Protocol (TCP), multicast or broadcast using Internet Protocol (IP), multicast or broadcast using TCP/IP, IP multicast, IP broadcast, multicast or broadcast using kernel UDP socket(s) (e.g., in addition to or instead of using kernel TCP/IP sockets), UDP multicast or broadcast, and/or other types of communication, e.g., non-unicast communication.

Although embodiments of the invention are not limited in this regard, the term "TCP/IP stack" as used herein may include, for example, a stack implemented (completely or partially) using TCP/IP, a stack implemented (completely or partially) using UDP, and/or other suitable implementations.

Although embodiments of the invention are not limited in this regard, the term "multicast operation" as used herein may include, for example, a multicast or broadcast related operation, an operation of a multicast or broadcast process, an operation of a multicast transmission process, an operation of a multicast reception process, or other one or more operations associated with performing multicast or broadcast.

Although portion of the discussion herein may relate, for demonstrative purposes, to "multicast" communication, embodiments of the invention may be used in conjunction with broadcast communication and/or other non-unicast communication.

In some embodiments, for example, multicast may include delivery of information to a group of destinations simultaneously or substantially simultaneously, using an efficient strategy to deliver messages over each link of the network only once, creating copies only when the links to the destinations split. For example, one or more routers may create efficient or optimal distribution paths for datagrams sent to a multicast destination address spanning tree. The multicast may be scalable to a larger receiver population without requiring prior knowledge of the number or identity of all the receivers. Multicast may utilize network infrastructure by requiring the source to send a packet only once, even if the packet needs to be delivered to a large number of receivers. The nodes in the network may replicate the packet to reach multiple receivers, for example, when necessary. For example, a multicast group address may be used by sources and receivers to send and receive content. A source may utilize the multicast group address as a destination address in sent data packets. Receivers may utilize the multicast group address to inform the network that they are interested in receiving packets sent to that group. Once the receivers joins a particular multicast group, a multicast distribution tree may be constructed for that group, for example, utilizing a predefined protocol, e.g., protocol independent multicast (PIM), sparse mode (SM) PIM, dense mode (DM) PIM, source specific mode (SSM) PIM, bidirectional mode (Bidir) PIM, or the like.

Although some portions of the discussion herein may relate, for demonstrative purposes, to a fast or high-speed interconnect infrastructure, to a fast or high-speed interconnect component or adapter with OS bypass capabilities, to a fast or high-speed interconnect card or Network Interface Card (NIC) with OS bypass capabilities, or to a to a fast or high-speed interconnect infrastructure or fabric, embodiments of the invention are not limited in this regard, and may be used in conjunction with other infrastructures, fabrics, components, adapters, host channel adapters, cards or NICs, which may or may not necessarily be fast or high-speed or with OS bypass capabilities. For example, some embodiments of the invention may be utilized in conjunction with InfiniBand (IB) infrastructures, fabrics, components, adapters, host channel adapters, cards or NICs; with Ethernet infrastructures, fabrics, components, adapters, host channel adapters, cards or NICs; with gigabit Ethernet (GEth) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs that have OS-bypass capabilities; with infrastructures, fabrics, components, adapters, host channel adapters, cards or NICs that are connection-less and/or stateless; and/or other suitable hardware.

In accordance with some embodiments of the invention, a multicast communication operation may be performed, for example, by a user mode application that may directly access a communication adapter, thereby bypassing the OS kernel and/or the kernel TCP/IP stack and/or OS device driver(s), and utilizing instead a user mode API or a standard IP-based API or a connectionless API.

In some embodiments, for example, a multicast server system may include a hardware adapter or card or NIC having OS-bypass capabilities and/or allowing direct access from a user space application. The user space application may utilize a user space API (for example, implemented as a library) instead of using the OS kernel or a device driver thereof or the kernel TCP/IP stack, in order to directly access the OS-bypass capable adapter and using its native semantics. Similarly, a multicast listening station may utilize multicast communications bypassing its OS kernel and/or device driver thereof and/or the kernel TCP/IP, for example, using a user space API able to directly access an OS-bypass capable adapter and using its native semantics. In some embodiments, thus, a multicast operation (e.g., transmitting or receiving a multicast packet) may be performed substantially exclusive in user space, externally to the OS kernel, bypassing the OS kernel, substantially without utilizing the kernel TCP/IP stack, substantially without utilizing device driver(s), utilizing a standard API, using an IP-based or other API, and utilizing a direct and non-kernel access from the user space application to the hardware communication adapter or vice versa.

FIG. 1 schematically illustrates a block diagram of a computing device 100 able to utilize multicast communication in accordance with a demonstrative embodiment of the invention. Device 100 may include, for example, a processor 111, an input unit 112, an output unit 113, a memory unit 114, a storage unit 115, and a communication unit 116. Device 100 may optionally include other suitable hardware components and/or software components. In some embodiments, the components of device 100 may be enclosed in, for example, a common housing, packaging, or the like.

Processor 111 may include, for example, a central processing unit (CPU), a digital signal processor (DSP), a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller. Processor 111 may, for example, execute one or more software applications, and may process signals and/or data transmitted and/or received by device 100.

Input unit 112 may include, for example, a keyboard, a keypad, a mouse, a touch-pad, a stylus, a microphone, or other suitable pointing device or input device. Output unit 113 may include, for example, a cathode ray tube (CRT) monitor or display unit, a liquid crystal display (LCD) monitor or display unit, a screen, a monitor, a speaker, or other suitable display unit or output device.

Memory unit 114 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a compact disk (CD) drive, a CD-ROM drive, a digital versatile disk (DVD) drive, or other suitable removable or non-removable storage units. Memory unit 114 and/or storage unit 115 may, for example, store data processed by device 100.

Communication unit 116 may include, for example, a wired or wireless network interface card (NIC), a remote direct memory access (RDMA) device (e.g., InfiniBand), a wired or wireless modem, a wired or wireless receiver and/or transmitter, a wired or wireless transmitter-receiver and/or transceiver, a radio frequency (RF) communication unit, or other units able to transmit and/or receive signals, blocks, frames, transmission streams, packets, messages and/or data. Communication unit 116 may optionally include, or may optionally be associated with, for example, one or more antennas, e.g., a dipole antenna, a monopole antenna, an omni-directional antenna, an end fed antenna, a circularly polarized antenna, a micro-strip antenna, a diversity antenna, or the like.

Device 100 may further include an operating system (OS) 120, for example, Microsoft® Windows®, Unix®, Linux®, Sun® Solaris®, Apple® Mac OS®, or the like. The OS 120 may include multiple operating modes, for example, a kernel mode 121 and a user mode 122.

The kernel mode 121 may directly access and interact with one or more components of device 100. The kernel mode 121 may include a TCP/IP stack 141, e.g., having multiple layers, for example, an application layer, a transport layer, a network layer, a data link layer, and a physical layer. The TCP/IP stack 141 may be utilized by software applications running in the user mode 122 through one or more sockets 142, for example, sockets which may be created, added, destroyed, deleted, modified and/or controlled using an application programming interface (API) 143 of the kernel operating mode 121 of OS 120.

In some embodiments, device 100 may allow non-multicast TCP/IP communication operations to be performed utilizing one or more high-speed interconnect components or infrastructure, for example, an InfiniBand (IB) communication fabric or switch fabric, an EtherFabric interconnect or protocol, or the like. In some embodiments, one or more components, modules or drivers may be used by the OS kernel 121 to perform non-multicast TCP/IP operations over an InfiniBand infrastructure, over an Ethernet hardware or port, or the like. In some embodiments, for example, an IP over InfiniBand module 144 may be able to interact with an InfiniBand host channel adapter (HCA) 151. Additionally or alternatively, for example, a network driver interface specification (NDIS) driver 145 (for example, a NIDS IP over Infini-Band module) may be able to communicate with a gigabit Ethernet (GEth) hardware or port 152.

The user mode 122 of OS 120 may allow a user of device 100 to run one or more software applications, for example, utilizing an interface provided by the kernel mode 121 in order to indirectly access one or more components of device 100. In some embodiments, for example, a multicast application 131 may be executed by processor 111 in user mode 122. The multicast application 131 may be or may include, for example, a software application which may perform a multicast operation. For example, the multicast application 131 may attempt to create a multicast socket, e.g., by attempting to add a multicast membership to sockets 143.

In some embodiments, a multicast protocol handler 133 may monitor, intercept and/or handle multicast operations of the multicast application 131. For example, the multicast protocol handler 133 may handle the multicast operation, e.g., directly utilizing or accessing high-speed interconnect components or infrastructure or communication unit 116, instead of utilizing the kernel mode TCP/IP stack 141. The multicast protocol handler 133 may run in user mode 122, may be executed or may reside in a user-space of user mode 122, may not be a part of the kernel mode 121, may be external to the kernel mode 121, may be implemented as a non-kernel extension library, or may be otherwise implemented externally to the kernel mode 121.

The multicast protocol handler 133 may listen to, or may otherwise monitor, multicast operations of multicast application 131. For example, the multicast protocol handler 133 may listen to or monitor interactions or communications from the multicast application 131 to one or more of the sockets 142, the API 143 and/or the TCP/IP stack 141. In some embodiments, for example, the multicast protocol handler 133 may listen to, or may otherwise monitor, an attempt or operation of the multicast application 131 to create or add a multicast socket, an attempt or operation of the multicast application 131 to add or create a multicast membership to sockets 143, or other attempts or operations of the multicast application 131 to otherwise create, delete, add, destroy, control and/or modify a multicast socket or a multicast process.

In some embodiments, the multicast protocol handler 133 may be or may include, for example, a layered service provider (LSP) to replace kernel operations handling multicast operations and/or multicast-related calls to the TCP/IP stack 141, and/or to replace kernel operations handling creation, destruction, addition, deletion, control and/or modification of multicast-related sockets 143. For example, when the multicast application 131 adds, or attempts to add, a multicast membership to sockets 143, the multicast protocol handler 133 may intercept the socket calls (e.g., send, receive, or the like) that are made by the multicast application 131 to the sockets 143. The multicast protocol handler 133 may then directly handle and fulfill the socket calls, for example, substantially without using components of the kernel-mode 121 (e.g., without using the kernel TCP/IP stack 141 and/or the kernel API 143), utilizing instead a native or proprietary API to perform a kernel bypass of the operation, and optionally by directly accessing, directly utilizing, or directly interacting with one or more high-speed interconnect components or infrastructure.

In some embodiments, the multicast protocol handler 133 may optionally include multiple modules or sub-units. For example, the extension library 133 may include a listener/interceptor module 161 able to monitor and intercept attempts or operations of the multicast application 131 to create, destroy, add, delete, control or modify a multicast kernel socket or a multicast-related kernel socket. The multicast protocol handler 133 may further include a bypass handler module 162 able to handle the intercepted multicast-related attempts or operations, e.g. by utilizing a native InfiniBand API.

In some embodiments, for example, the bypass handler module 163 may include one or more sub-modules specifically tailored to efficiently perform multicast input/output (I/O) operations utilizing the high-speed infrastructure. In some embodiments, the bypass handler module 162 of multicast protocol handler 133 may directly access, and/or may directly interact with, the InfiniBand HCA 151, e.g., externally to the kernel mode 121 components, for example, without utilizing the OS's network interface, e.g., the IP over IB module 144 of the kernel mode 121. In some embodiments, the bypass handler module 162 of multicast protocol handler 133 may directly access, and/or may directly interact with, the GEth hardware 152, e.g., externally to the kernel mode 121 components, for example, without utilizing the OS's network interface, e.g., the NDIS IP over IB driver 145 of kernel mode 121. In some embodiments, multicast protocol handler 133 may implement the required bypass operations in user mode 122 space (e.g., in user-space), and may utilize native semantics and/or parameters and/or operations of the high-speed interconnect infrastructure (e.g., of InfiniBand, of GEth, or the like). This may allow, for example, multicast communication packets or data to be transferred directly between the InfiniBand HCA 151 or the GEth hardware 152 and the multicast application 131, e.g., bypassing the components of the kernel (e.g., bypassing the TCP/IP stack 141, the kernel sockets 142, the kernel API 143, or the like).

In some embodiments, for example, the multicast application 131 may listen to multicast data, and may make socket listen calls to the multicast socket address family. The calls may be intercepted by the multicast protocol handler 133, which may implement the underlying operations in user-space, for example, utilizing native InfiniBand or GEth API's and/or semantics. This may allow, for example, the multicast packets to be sent and received directly to or from the Infini-Band HCA 151 or the GEth hardware 152, thereby bypassing the kernel and the TCP/IP stack 141.

In some embodiments, the multicast application 131 may utilize multiple network interfaces, for example, the Infini-Band HCA 151 and the GEth hardware 152, and/or other ports or cards. The multicast protocol handler 133 may be configured to directly handle multicast communications associated with multiple network interfaces, e.g., serially, in parallel, substantially simultaneously, or the like. In one embodiment, substantially all multicast communication operations of the multicast application 131 may be exclusively handled by the multicast protocol handler 133 and not by the kernel components, e.g., without using the kernel TCP/IP stack 141, the kernel sockets 142, the kernel API 143, or the like. In another embodiment, some of the multicast communication operations of the multicast application 131 may be exclusively handled by the multicast protocol handler 133, whereas other multicast operations of the multicast application 131 may be handled by kernel components (e.g., by the TCP/IP stack 141, the kernel sockets 142, the kernel API 143, or the like).

For example, in some embodiments, a hybrid multicast application may listen to multicast communications incoming from the listener 161 of InfiniBand HCA, by using its VERBS API or other API, or similar alternative network device such as Ethernet NIC or iWarp NIC. If the data is received from the listener 161 of InfiniBand HCA 151 or alike, then the multicast protocol handler 133 may intercept the socket call and may perform the underlying operations utilizing native RDMA semantics, for example, InfiniBand native semantics. In contrast, if the data is received from the Ethernet NIC, the multicast protocol handler 133 may pass the socket call to the kernel API 143 responsible for handling multicast operations. Also in contrast, some of the multicast data may be received from the TCP/IP kernel socket API, while some of the multicast data may be received by the multicast protocol handler 133 from the user mode listener 161 of, for example, the InfiniBand HCA 151. Thus, in some embodiments, a single (e.g., hybrid) multicast application 131 may listen on multiple network components (e.g., the InfiniBand HCA 161, the GEth port 162, an Ethernet NIC, or the like) and multiple user and kernel modes without requiring configuration changes to accommodate the hybrid environment.

In some embodiments, the multicast protocol handler 133 may be implemented using, for example, a library extension, a library module or component, a non-library component or module, a shared object, a non shared object, a dynamic link library (DLL), a non-DLL such as static library, or the like. For example, in some embodiments, listener/interceptor module 161 and/or bypass handler module 162 need not be implemented using an extension library, and may be implemented, for example, as a code block included or embedded within multicast application 131, as a plug-in or portable code associated with multicast application 131, as a dynamically loaded library (e.g., which may be dynamically loaded using an OS environmental variable or parameter, or an OS service provider or OS loader provider, for example, LD-PRELOAD or pre-registered service provider), as a compile-able or link-able code block or object, or the like.

Some embodiments of the invention may allow, for example, a substantially complete kernel bypass for multicast operations; lower CPU utilization, e.g., of processor 111; decreased consumption of processing power, processing time, or processing resources; reduced latency; increased packets-per-second (PPS) rates; reduced overhead of the TCP/IP stack 141; elimination of context switches, reduction of CPU interrupts, e.g., utilizing an implementation in user-space in the context of the multicast application, thereby allowing a multicast server or client to generate or absorb a greater number of multicast messages; elimination of kernel buffer copies, for example, such that data may flow from the InfiniBand HCA 161 or the GEth hardware 152 substantially directly to a multicast application buffer in user-space and without intermediate kernel I/O buffers or kernel memory buffers; elimination of CPU interrupts for newly received multicast packets; elimination of queue congestion problems associated with TCP/IP stack usage; reduced memory consumption; elimination of memory "starvation" due to elimination of kernel buffer copies of multicast data, reduced memory cache miss events, for example, due to elimination of context switches; or the like. Some embodiments of the invention may provide additional and/or other benefits or advantages.

Figure 2:
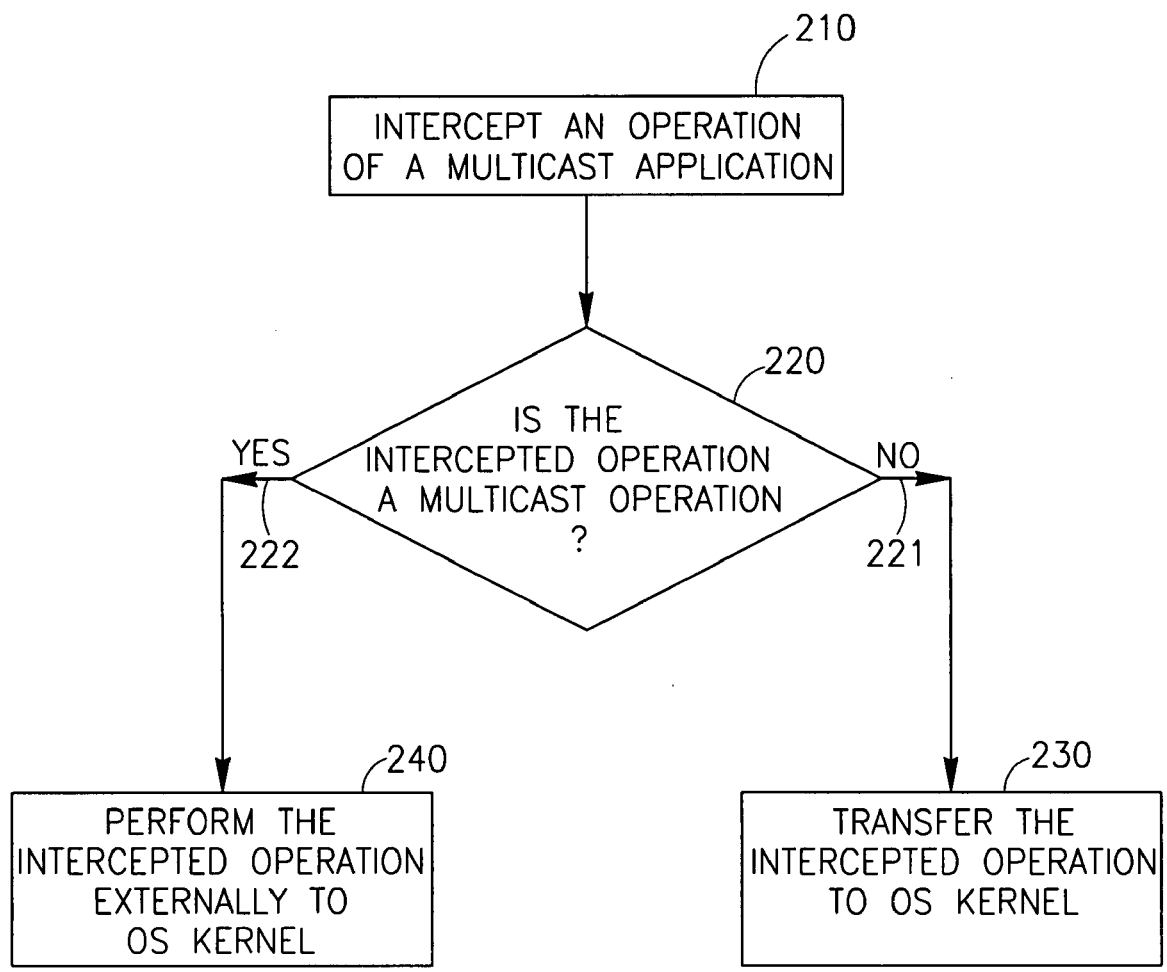
FIG. 2 is a schematic flow-chart of a method of multicast communication in accordance with a demonstrative embodiment of the invention.

FIG. 2 is a schematic flow-chart of a method of multicast communication in accordance with some embodiments of the invention. Operations of the method may be implemented, for example, by device 100 of FIG. 1, by multicast protocol handler 133 of FIG. 1, and/or by other suitable units, devices, and/or systems.

As indicated at block 210, the method may optionally include, for example, intercepting an operation of a multicast application, e.g., sent from the multicast application to the OS kernel.

As indicated at block 220, the method may optionally include, for example, checking whether the intercepted operation is (or includes) a multicast operation.

As indicated by arrow 221, if the intercepted operation is not a multicast operation or specific multicast operation that was pre-defined as non-intercepted, then the method may optionally include, as indicated at block 230, transferring the intercepted operation to the OS kernel for execution by the OS kernel.

In contrast, as indicated by arrow 222, if the intercepted operation is a multicast operation, then the method may optionally include, as indicated at block 240, performing the multicast operation externally to the OS kernel, e.g., utilizing native semantics of a high-speed interconnect component or infrastructure such as InfiniBand API.

Although the method of FIG. 2 may be used, for demonstrative purposes, in conjunction with processing of multicast sending operations, similar methods may be used in conjunction with multicast listening operations. For example, in some embodiments, a multicast listening operation may be intercepted, and may be replaced or bypassed by performing the multicast operation externally to the OS kernel, e.g., utilizing native semantics of a high-speed interconnect component or infrastructure such as InfiniBand API.

Other operations or sets of operations may be used in accordance with embodiments of the invention.

Although FIG. 2 relates, for demonstrative purposes, to multicast transmission, similar methods may be used in accordance with embodiments of the invention in conjunction with multicast reception or multicast listening. Some embodiments of the invention may utilize multicast transmission and/or multicast reception which may, for example, bypass the OS kernel, bypass the kernel TCP/IP stack, bypass the kernel sockets, allow direct (e.g., non-kernel or substantially non-kernel) communication between the user-mode application and a network adapter having OS bypass capabilities (e.g., InfiniBand, iWarp, or the like), and/or may utilize native semantics of the network adapter having OS bypass capabilities. Accordingly, portions of the discussion herein that may relate, for demonstrative purposes, to multicast transmission, may be used in accordance with embodiments of the invention also in conjunction with multicast reception or multicast listening.

Figure 3:
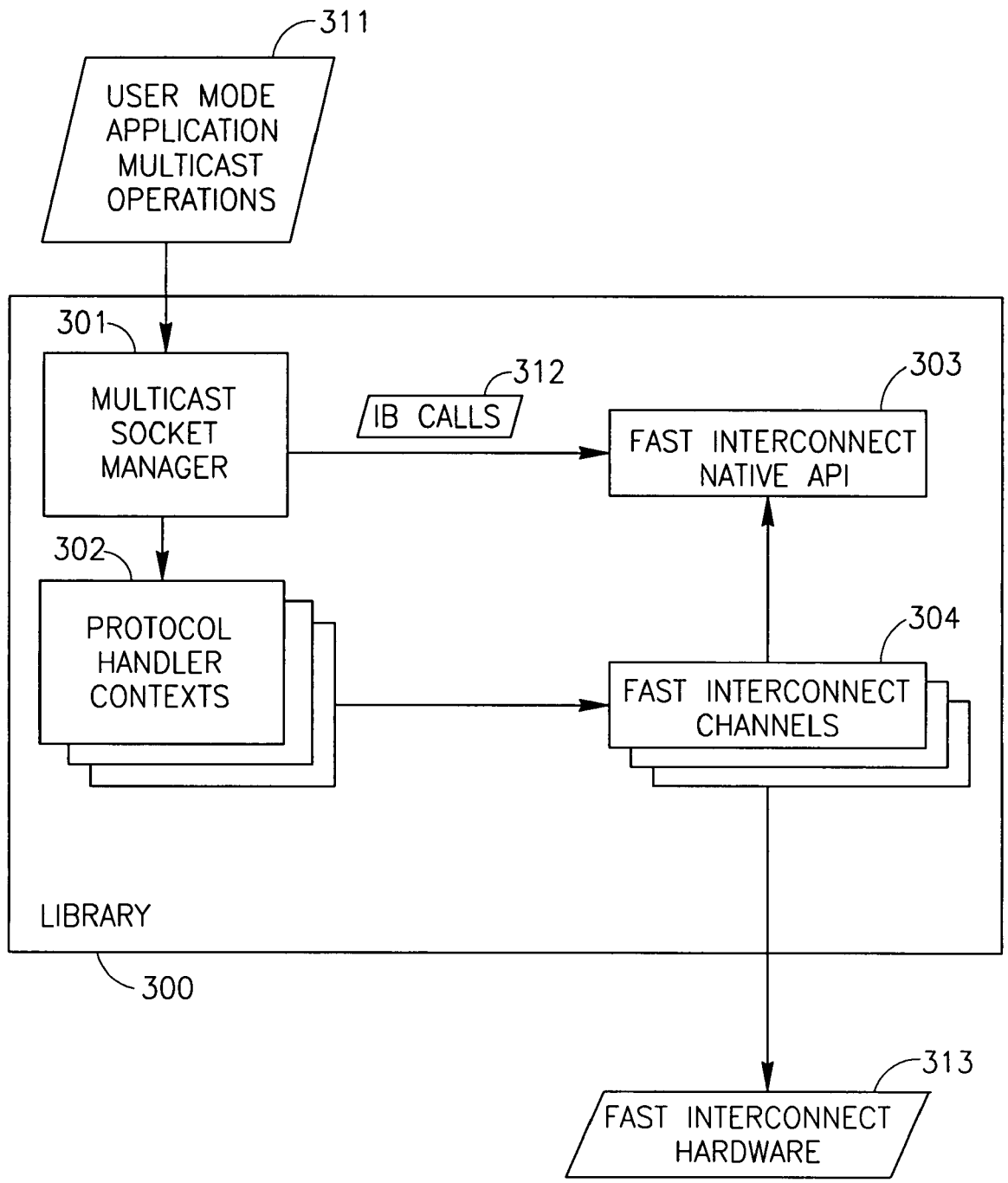
FIG. 3 is a schematic block diagram of a multicast offload library in accordance with a demonstrative embodiment of the invention.

FIG. 3 schematically illustrates a block diagram of a multicast offload library 300 in accordance with a demonstrative embodiment of the invention. Library 300 may be, for example, a demonstrative implementation of multicast protocol handler 133 of FIG. 1. Library 300 may include, for example, a multicast socket manager 301, protocol handler contexts 302 (for example, a protocol handler context per socket), a fast interconnect native API 303, and fast interconnect channels 304 (for example, a fast interconnect channel per socket). The library 300 may be used to handle user mode application multicast operations 311, by internally performing native semantics calls (for example, InfiniBand calls 312 to the fast interconnect native API 303), and allowing direct and non-kernel access to the fast interconnect hardware 313.

The multicast socket manager 301 may include, for example, a socket switch able to intercept application level calls to socket API. The multicast socket manager 301 may detects relevant multicast calls to be routed or switched to the bypass handler (e.g., the bypass handler 162 of FIG. 1); for example, the bypass handler may utilize the fast interconnect API to handle such multicast calls. The multicast socket manager 301 may detect non-relevant calls, and may route them for kernel processing, may drop them, or may perform other type of pre-defined handling.

The fast interconnect native API 303 may include, for example, RDMA communication manager (CM) API, which may be a user mode native API able to perform the fast interconnect I/O operations.

The fast interconnect native API 303 with OS bypass capabilities may include, for example, RDMA communication manager (CM) API, which may be a user mode native API able to perform the fast interconnect I/O operations.

The fast interconnect channels 304 may include, for example, the fast interconnect hardware communication channels that correspond to the user application sockets. For example, a fast interconnect channel per socket or per process (that has one or more sockets) may be used.

In some embodiments, at startup, the library 300 may establish a handle to the fast interconnect hardware, and may perform initialization operations and resource allocation per process when loaded. When a multicast socket is created by a user mode application, the creation is intercepted by the multicast socket manager 301, and a protocol handler context 302 is allocated corresponding to the created socket. The context may include hardware and/or software resources required for subsequent I/O operations using this socket which are routed to the fast interconnect hardware, for example, an InfiniBand channel queue-pair (QP) and a completion object or completion queue (CQ). Additionally, I/O memory buffers may be allocated and posted for the I/O operations.

Although portions of the discussion herein may relate, for demonstrative purposes, to protocol handler context per socket or to fast interconnect channel per socket, embodiments of the invention are not limited in this regard, and may be used, for example, in conjunction with protocol handler context per process, channel per process, or other suitable implementations.

In some embodiments, when an IP multicast membership registration is performed by the user mode application, the operation may be mapped to the fast interconnect hardware multicast address. The mapping may include, for example, registration of the local fast interconnect port towards the fast interconnect fabric, and attachment of the fast interconnect's channel to the created multicast group. In some embodiments, the mapping of the multicast IP address to the fast interconnect hardware multicast address may be substantially similar to the mapping used with the fast interconnect OS network interface mapping, for example, the IP over InfiniBand network interface. Accordingly, each one of the communication sides (sender or receiver) may be using or non-using the library 300. Furthermore, one of the communication sides may reside outside the fast interconnect fabric, for example, an Ethernet fabric, and may communicate with a server residing on the fast interconnect fabric using the multicast offload library 300.

Upon substantially any socket operation (for example, send( ), recv( ), select( ), or the like) where the socket is mapped to a multicast offload library socket, the corresponding context is selected in order to map the socket to the fast interconnect communication channel per this socket; for example, QP may map the socket for InfiniBand.

With regard to a receive operation, the multicast packet may be routed to the pre-joined fast interconnect port, and then routed internally by the local fast interconnect hardware, for example, from the InfiniBand HCA to the attached communication channel QP. The communication channel QP may be associated with a user application receive buffer, which may absorb the incoming packet. The application may receive the incoming packet using a socket receive call, which may be mapped by the offload library 300 directly to the fast interconnect hardware, namely, communication channel receive buffer. The receive operation may thus be fulfilled substantially without direct OS intervention.

With regard to a transmit operation, the multicast message may be sent using any send operation call, which may be initiated in the user mode application. The offload library 300 may intercept the multicast send operation, by mapping of the user application socket to its multicast socket context. The offload library 300 may then build an IP packet (for example, a standard IP socket in accordance with the Internet Engineering Task Force (IETF) standard) containing the user application data. The offload library 300 may use the fast interconnect communication channel QP associated with the user application socket for routing the packet directly to the local fast interconnect hardware (for example, the InfiniBand HCA). The send operation may thus be fulfilled substantially without direct OS intervention.

In some embodiments, using the fast interconnect's completion queue (CQ), the offload library 300 may allow mapping of multiple user application socket operations completion notifications to a single hardware queue. This may allow the mapping of socket notifications multiplexing operations, for example, select call, to a single fast interconnect shared completion queue. This may be performed, for example, by associating the communication channels corresponding to the multiplexed sockets operations with this single fast interconnect completion queue.

In some embodiments, upon the user application's multicast socket close operation, the corresponding offload library socket context is released with its registered fast interconnect resources, namely, the communication channel QP and its completion queue CQ. Furthermore, the communication channel may be de-attached from the local fast interconnect hardware (the InfiniBand HCA), and the fast interconnect's port operations may be de-registered.

Although portions of the discussion herein may relate, for demonstrative purposes, to "bypassing" of the OS kernel or components thereof or the kernel TCP/IP stack, embodiments of the invention are not limited in this regard and may include, for example, a substantially complete bypassing, a partial bypassing, a significant bypassing, a selective bypassing, a bypassing of one or more components or modules, or the like.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by device 100 of FIG. 1, by processor 111 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a non-kernel multicast protocol handler to perform a multicast operation of a user mode application by bypassing an operating system kernel and directly accessing a communication adapter having an operating system bypass capability,
wherein the non-kernel multicast protocol handler is to replace operating system kernel operations handling multicast operations with one or more operations of a multicast offload library,
wherein the non-kernel multicast protocol handler is to replace operating system operations and kernel operations handling of multicast-related calls to a TCP/IP stack with one or more operations of the multicast offload library,
wherein the non-kernel multicast protocol handler is to map the multicast operation to a socket interface of the multicast offload library implemented in user-space and externally to the operating system kernel,
wherein the non-kernel multicast protocol handler is to select a context corresponding to a communication channel of an interconnect attached to said communication adapter,
wherein the non-kernel multicast protocol handler is to intercept a socket operation of creation of an IP multicast membership registration of the user mode application, to map the intercepted socket operation to user-mode multicast protocol handling of said interconnect, and to map the socket of the user mode multicast protocol handler directly to said interconnect to result in a user-mode socket like interface which is mapped directly to said communication channel of said interconnect;
wherein the non-kernel multicast protocol handler operates externally to a kernel mode of said operating system and externally to a kernel of said operating system,
wherein the non-kernel multicast protocol handler operates independently of kernel TCP/IP stack, independently of Operating System socket Application Programming Interface (API), and independently of kernel Application Programming Interface (API), wherein the non-kernel multicast protocol handler is implemented in user-space in the same context of the user-mode multicast application, in the same memory space of the user-mode multicast application, and in the same process of the user-mode multicast application, to avoid context switch, to reduce processor interrupts, to avoid kernel interrupts, to avoid utilization of an intermediate kernel buffer, to avoid kernel buffer copies, to avoid user-mode to kernel-mode context switch, and to avoid a system call by the user-mode multicast application to the kernel for handling the multicast operation.

2. The apparatus of claim 1, wherein the non-kernel multicast protocol handler is to perform said multicast operation using a native semantic of said communication adapter.

3. The apparatus of claim 1, wherein said communication adapter comprises an InfiniBand adapter.

4. The apparatus of claim 1, wherein the non-kernel multicast protocol handler is to perform said multicast operation in user space.

5. The apparatus of claim 1, wherein said multicast operation comprises (a) an Internet Protocol (IP) multicast operation, (b) an IP header, and (c) a UDP header,
wherein the non-kernel multicast protocol handler is to perform said IP multicast operation externally to a TCP/IP stack of said operating system, kernel,
wherein the user-mode application is to utilize the user-mode multicast protocol handler to directly interact with a remote application which is located on a remote device and utilizes a kernel-mode TCP/IP multicast protocol handler implemented using native Operating System stack of said remote device.

6. The apparatus of claim 1, wherein the non-kernel multicast protocol handler is to monitor operations sent by said user mode application for execution by said operating system kernel.

7. The apparatus of claim 6, wherein the non-kernel multicast protocol handler is to intercept the multicast operation.

8. The apparatus of claim 6, wherein the non-kernel multicast protocol handler is to intercept a multicast operation selected from a group consisting of:
a multicast send operation,
a multicast receive operation,
an operation to add a multicast socket,
an operation to delete a multicast socket,
an operation to modify a multicast socket, and
an operation to control a multicast socket.

9. The apparatus of claim 1, further comprising a processor to execute instructions of a multicast application.

10. A method comprising:
intercepting a multicast operation of a user mode application; and
performing said multicast operation by bypassing an operating system kernel and directly accessing a communication adapter having an operating system bypass capability,
wherein the performing comprises:
replacing operating system kernel operations handling multicast operations with one or more operations of a multicast offload library implemented in user-space and externally to the operating system kernel;
replacing operating system operations and kernel operations handling of multicast-related calls to a TCP/IP stack with one or more operations of the multicast offload library;

mapping the multicast operation to a socket interface of the multicast offload library;

selecting a context corresponding to a communication channel of an interconnect attached to said communication adapter;

intercepting a socket operation of creation of an IP multicast membership registration of the user mode application, and mapping the intercepted socket operation to user-mode multicast protocol handling of said interconnect, and mapping the socket of the user mode multicast protocol handler directly to said interconnect to result in a user-mode socket like interface which is mapped directly to said communication channel of said interconnect;

wherein the multicast offload library operates externally to a kernel mode of said operating system and externally to a kernel of said operating system, wherein the multicast offload library operates independently of kernel TCP/IP stack, independently of Operating System socket Application Programming Interface (API), and independently of kernel Application Programming Interface (API), wherein the multicast offload library is implemented in user-space in the same context of the user-mode multicast application, in the same memory space of the user-mode multicast application, and in the same process of the user-mode multicast application, to avoid context switch, to reduce processor interrupts, to avoid kernel interrupts, to avoid utilization of an intermediate kernel buffer, to avoid kernel buffer copies, to avoid user-mode to kernel-mode context switch, and to avoid a system call by the user-mode multicast application to the kernel for handling the multicast operation.

11. The method of claim 10, wherein performing comprises:
performing said multicast operation using a native semantic of said communication adapter.

12. The method of claim 10, wherein performing comprises:
performing said multicast operation using a native Infini-Band semantic.

13. The method of claim 10, wherein performing comprises:
performing said multicast operation in user space.

14. The method of claim 10, wherein said multicast operation comprises (a) an Internet Protocol (IP) multicast operation, (b) an IP header, and (c) a UDP header,
wherein performing comprises:
performing said multicast operation externally to a TCP/IP stack of said operating system, kernel; and
enabling the user-mode application to utilize the user-mode multicast offload library to directly interact with a remote application which is located on a remote device and utilizes a kernel-mode TCP/IP multicast protocol handler implemented using native Operating System stack of said remote device.

15. The method of claim 10, comprising:
monitoring operations sent by said user mode application for execution by the operating system kernel.

16. The method of claim 15, comprising:
selectively intercepting said multicast operation in accordance with a pre-defined criterion.

17. The method of claim 16, comprising:
intercepting a multicast operation selected from a group consisting of:
a multicast send operation,
a multicast receive operation,
an operation to add a multicast socket,
an operation to delete a multicast socket,
an operation to modify a multicast socket, and
an operation to control a multicast socket.

18. A machine-readable storage article having stored thereon instructions that, when executed by a machine, cause the machine to perform a method comprising:
intercepting a multicast operation of a user mode application; and
performing said multicast operation by bypassing an operating system kernel and directly accessing a communication adapter having an operating system bypass capability,
wherein the performing comprises:
replacing operating system kernel operations handling multicast operations with one or more operations of a multicast offload library implemented in user-space and externally to the operating system kernel;
replacing operating system operations and kernel operations handling of multicast-related calls to a TCP/IP stack with one or more operations of the multicast offload library;
mapping the multicast operation to a socket interface of the multicast offload library;
selecting a context corresponding to a communication channel of an interconnect attached to said communication adapter;
intercepting a socket operation of creation of an IP multicast membership registration of the user mode application, mapping the intercepted socket operation to user-mode multicast protocol handling of said interconnect, and mapping the socket of the user mode multicast protocol handler directly to said interconnect to result in a user-mode socket like interface which is mapped directly to said communication channel of said interconnect;
wherein the multicast offload library operates externally to a kernel mode of said operating system and externally to a kernel of said operating system,
wherein the multicast offload library operates independently of kernel TCP/IP stack, independently of Operating System socket Application Programming Interface (API), and independently of kernel Application Programming Interface (API),
wherein the multicast offload library is implemented in user-space in the same context of the user-mode multicast application, in the same memory space of the user-mode multicast application, and in the same process of the user-mode multicast application, to avoid context switch, to reduce processor interrupts, to avoid kernel interrupts, to avoid utilization of an intermediate kernel buffer, to avoid kernel buffer copies, to avoid user-mode to kernel-mode context switch, and to avoid a system call by the user-mode multicast application to the kernel for handling the multicast operation.

19. The machine-readable storage article of claim 18, wherein performing comprises:
performing said multicast operation using a native semantic of said communication adapter.

20. The machine-readable storage article of claim 18, wherein performing comprises:
performing said multicast operation using a native Infini-Band semantic.

21. The machine-readable storage article of claim 18, wherein said multicast operation comprises (a) an Internet Protocol (IP) multicast operation, (b) an IP header, and (c) a UDP header, and wherein performing comprises:

performing said multicast operation in user space, and
enabling the user-mode application to utilize the user-mode multicast offload library to directly interact with a remote application which is located on a remote device and utilizes a kernel-mode TCP/IP multicast protocol handler implemented using native Operating System stack of said remote device.

* * * * *